(12) United States Patent
Merbach

(10) Patent No.: US 10,011,401 B2
(45) Date of Patent: Jul. 3, 2018

(54) METHOD FOR PRODUCING A THERMOFORMED ITEM, AND SUCH AN ITEM

(75) Inventor: Juergen Merbach, Stade (DE)

(73) Assignee: RPC BEBO-PLASTIK GMBH (DE)

(*) Notice: Subject to any disclaimer, the term of this patent is extended or adjusted under 35 U.S.C. 154(b) by 205 days.

(21) Appl. No.: 14/129,460

(22) PCT Filed: Jun. 28, 2012

(86) PCT No.: PCT/EP2012/062580
§ 371 (c)(1),
(2), (4) Date: Apr. 23, 2014

(87) PCT Pub. No.: WO2013/001008
PCT Pub. Date: Jan. 3, 2013

(65) Prior Publication Data
US 2014/0224805 A1 Aug. 14, 2014

(30) Foreign Application Priority Data
Jun. 28, 2011 (DE) .................. 10 2011 051 402

(51) Int. Cl.
| B32B 3/30 | (2006.01) |
| B65D 43/02 | (2006.01) |
| B29C 51/34 | (2006.01) |
| B29D 22/00 | (2006.01) |
| B29C 51/08 | (2006.01) |
| B29C 51/44 | (2006.01) |

(Continued)

(52) U.S. Cl.
CPC .......... B65D 43/0225 (2013.01); B29C 51/34 (2013.01); B29D 22/003 (2013.01); B65D 43/0231 (2013.01); *B29C 51/082* (2013.01); *B29C 51/445* (2013.01); *B29C 2791/006* (2013.01); *B29C 2791/007* (2013.01); *B29L 2001/00* (2013.01); *B29L 2031/565* (2013.01); *B29L 2031/7132* (2013.01); *B65D 2543/00092* (2013.01); *B65D 2543/00296* (2013.01); *B65D 2543/00527* (2013.01); *B65D 2543/00537* (2013.01)

(58) Field of Classification Search
CPC .............................. B29C 51/20; B29C 51/34
See application file for complete search history.

(56) References Cited

U.S. PATENT DOCUMENTS

| 3,267,521 A | 8/1966 | Kostur |
| 3,618,170 A | 11/1971 | Owens |

(Continued)

FOREIGN PATENT DOCUMENTS

| DE | 202010016248 U1 | 4/2011 |
| WO | 2004106162 A2 | 12/2004 |
| WO | 2010146997 A1 | 12/2010 |

*Primary Examiner* — Galen H Hauth
(74) *Attorney, Agent, or Firm* — Stevens & Showalter, LLP

(57) ABSTRACT

The present invention relates to a method for manufacturing a thermoformed article, in particular a packaging article, such as a container or container lid, and to a thermoformed article, in particular a packaging article, e.g. in form of a container or container lid. At least one threaded or catch segment projecting in a radial direction is formed on such an article in order to provide a thread-like or bayonet-coupling-like structure and thus a possibility for closing the article.

7 Claims, 4 Drawing Sheets

(51) Int. Cl.
 *B29L 1/00* (2006.01)
 *B29L 31/56* (2006.01)
 *B29L 31/00* (2006.01)

(56) References Cited

U.S. PATENT DOCUMENTS

| | | | |
|---|---|---|---|
| 3,784,342 A * | 1/1974 | Merklinghaus | B26F 1/40 |
| | | | 425/292 |
| 4,361,457 A * | 11/1982 | Keeler | B29C 51/14 |
| | | | 156/224 |
| 4,822,553 A * | 4/1989 | Marshall | B29C 51/34 |
| | | | 249/122 |
| 2007/0187408 A1 | 8/2007 | Franzen | |
| 2008/0044603 A1 * | 2/2008 | Hutchinson | B29C 51/04 |
| | | | 428/35.7 |

\* cited by examiner

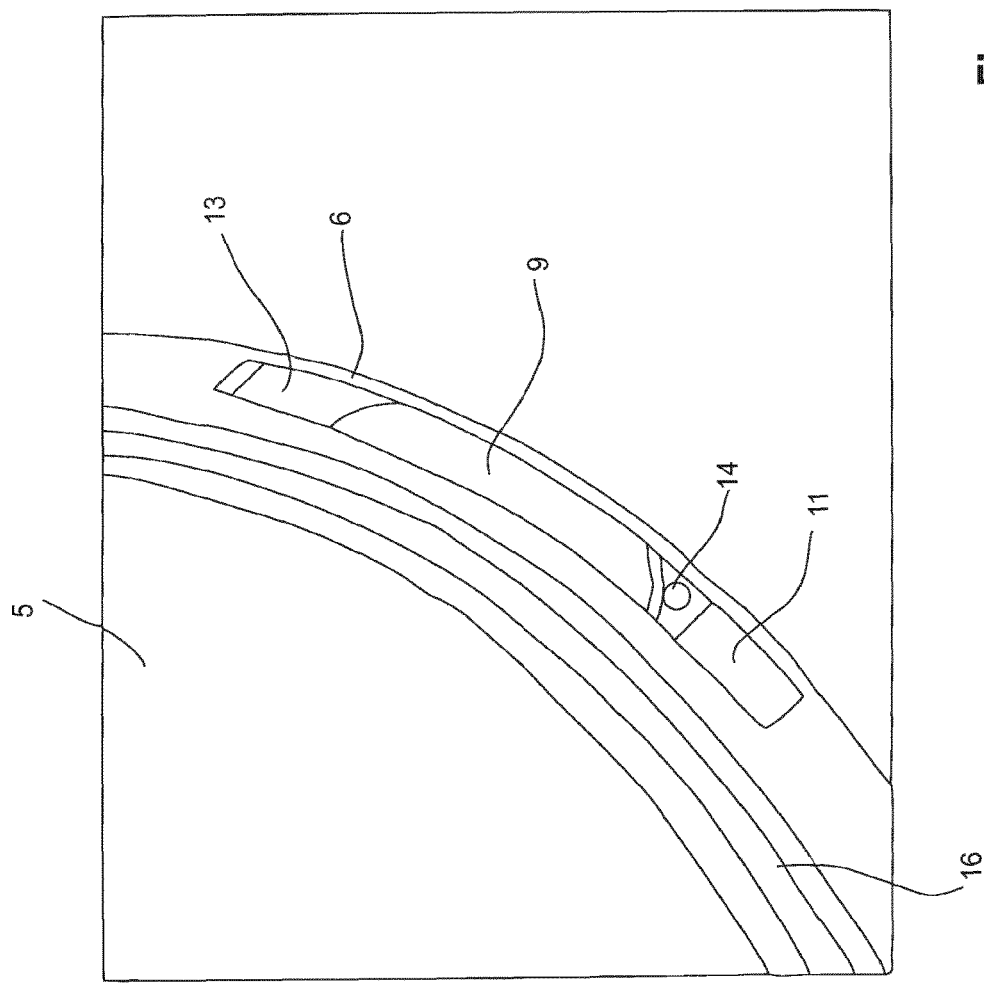

METHOD FOR PRODUCING A THERMOFORMED ITEM, AND SUCH AN ITEM

FIELD OF THE INVENTION

The present invention relates to a method for manufacturing a thermoformed article, in particular a packaging article, such as a container or container lid, and to a thermoformed article, in particular a packaging article, e.g. in form of a container or container lid. At least one threaded or catch segment projecting in a radial direction is formed on such an article in order to provide a thread-like or bayonet-coupling-like structure and thus a possibility for closing the article.

BACKGROUND OF THE INVENTION

According to the prior art, thermoformed packaging articles, such as cups and bowls, in particular for packaging foodstuffs, are sealed by a sealing film and possibly packaged using a cardboard sleeve or a covering box or additionally provided with a slid lid. Closure by means of a sealing film is necessary in order to achieve a sealing to the environment. By use of a covering package or a slid lid alone, a packaging article cannot be tightly closed according to the prior art. The fit of a lid on the container is dependent, inter alia, on the outer edge dimensions of the container, the fit size of the lid, and the configuration, position and number of nubs retaining the lid on the container. All in all, the lid fit is subject to variations which are possibly interfered with by contractions and deformations due to a sterilization process during or after filling the packaging article with foodstuffs. Such contractions or deformations cannot be taken into account and influenced by the manufacturer of the package.

The compelling use of a sealing for tightly closing the packaging article involves disadvantages, for example, in form of increased expenditure in manufacturing and materials. A further disadvantage is that a once opened packaging article cannot be tightly re-closed, thereby limiting potential uses and fill sizes of the packaging article.

SUMMARY OF THE INVENTION

Based on the above-described prior art, it is the object of the invention to provide a thermoformed article, in particular a packaging article, for example, in form of a container or container lid, which can be tightly closed without being compelled to use a sealing and, in particular, can be tightly re-closed after a first use. An improved tightness as compared to conventional lids used with thermoformed packaging articles is to be achieved.

In the following description, the invention is, in most cases, explained with reference to a thermoformed article. The term "article" is to be understood, in the sense of the present application, such that it refers to packaging articles and, in particular, to containers in the broadest sense and to container lids. In general, the articles comprise an article base and an article wall, which terms are accordingly also used for container base, container wall, lid base and lid wall. They may be of arbitrary shape, but are circular in shape, at least in a partial area of the article wall, and have a circular cross-section parallel to the article base in order to enable twisting for screwing or connecting an article (e.g. a container) to a corresponding counterpart (e.g. a lid).

On the method side, the above-mentioned object is achieved by a method for manufacturing a thermoformed article, in particular a packaging article, such as a container or container lid, in a thermoforming tool including an upper die and a lower die, which are movable against each other, wherein a plastic film is supplied between upper die and lower die, upper die and lower die are closed, and the supplied plastic film is thermoformed, thereby forming an article having an article wall and an article base, wherein at least one threaded or catch segment is formed on the article during thermoforming, wherein the at least one threaded or catch segment extends in a circumferential direction of the article and projects from the article wall in a radial direction.

On the apparatus side, the object of the invention is achieved by a thermoformed packaging article, such as a container or container lid, preferably manufactured by a method according to the invention, including an article base and an article wall, wherein at least one threaded or catch segment projecting in a radial direction is formed on the article. It is further achieved by a packaging system comprising a thermoformed article in form of a container according to the invention, and a thermoformed article in form of a container lid according to the invention, wherein the container lid is, in particular, radially oversized with respect to the container.

By the method according to the invention, a tightly closable and, in particular, tightly re-closable article can be produced by thermoforming, for example in form of a container and an associated container lid. The shape of the article and, in particular, the at least one threaded or catch segment are preferably produced in one operation during thermoforming. Thus, the article can be advantageously produced with short cycle times.

The container comprises at least one threaded or catch segment. In specific embodiments, it can comprise two or more such segments. In the case of threaded segments, said segments may overlap each other, at least in part, in the vertical direction of the container wall (in the direction of closure of the tool). In the case of catch segments, said segments are spaced from each other in the circumferential direction of the article. This is also possible in the case of threaded segments, in which case a thread with threaded flanges provided in sections is formed. A threaded or catch segment in the sense of the invention projects from the article, preferably from its article wall, in a radial direction of the article. Preferably, it projects outwards, but may also project radially inwards into the volume surrounded by the article. Preferably, a segment extends in a circumferential direction of the article. The at least one threaded or catch segment or a plurality (at least two) of threaded or catch segments form bayonet-coupling-like or thread-like structures on the thermoformed article which, in combination with corresponding counter-structures on a matching counterpart, form a bayonet coupling or thread for closing or re-closing the article. By the segments formed in the manner of a bayonet coupling or thread, a connection of suitable tightness is created which can easily be closed and opened by user a number of times.

According to the invention, the threaded or catch segments are formed in a thermoforming tool during thermoforming. Particularly advantageously, according to one embodiment, said segments are fully formed or formed in their complete finished structure during thermoforming. A plurality of such segments can be formed, which are spaced from each other in a circumferential direction of the article. In addition, the structure of the segments projecting in a circumferential direction of the article can be formed during thermoforming, whereas the final shape is ultimately created when punching the thermoformed article out of the plastic film.

At least one threaded or catch segment can be formed, at least in sections, in the film plane. In this case, the thermoforming tool can advantageously be of simple shape since, due to the segments lying in the film plane or tool separation plane, removing and ejecting the thermoformed articles from the tool is easily possible.

According to another embodiment of the invention, at least one threaded or catch segment can be formed, at least in sections, parallel to the film plane. Alternatively or in addition thereto, it or they can be sloped, at least in sections, with respect to the film plane. It can also be formed offset with respect to the film plane in the direction of movement of the tool. In the case of sloped segments or segments formed outside of the tool separation plane, arrangements for removal from the tool are to be made. For example, a tool die or similar element can be provided which is radially advanced during thermoforming or prior to thermoforming and provides the mold, at least for sections or partial areas of a threaded or catch segment, in the tool. For removal, the die is moved from its shaping position into a removal position, in which the thermoformed article can be removed or ejected from the thermoforming tool.

Another possibility of producing and removing a threaded or catch segment is provided by another embodiment of the invention, according to which a radial cavity or recess is formed in the upper and/or lower die which is vented during thermoforming so that a film located in the thermoforming tool is moved into the cavity, thus forming a threaded or catch segment. Instead of or in addition to venting the cavity or recess, pressure can be applied to the film material located in the tool from the side opposite to the recess or cavity. Finally, after forming a threaded or catch segment, a region of the upper and/or lower die can be positioned radially in order to enable removal of the article from the thermoforming tool.

After thermoforming of the articles from a plastic film, the formed article or a plurality of formed articles is or are punched out of the film. Threaded or catch segments preformed during thermoforming can be ultimately finished by punching them out of the plastic film. This embodiment of the method is particularly advantageous if the segments are thermoformed in the film or tool separation plane, wherein finishing of the segments and punching the article out of the film are carried out in a simple and fast manner in one operation.

The thermoformed articles according to the invention can be advantageously manufactured with conventional thermoforming machines, in particular, trim-in-place machines, and machines with separate molds and punches.

Particularly advantageously, a circumferential sealing edge can be formed on the side of the article wall opposite to the article base, which sealing edge may be located, in particular, parallel to the article base. In addition thereto, the packaging article can then be tightly closed by a sealing element, for example a sealing film, in the manner of an originality seal. Particularly advantageously, a threaded or catch segment is arranged at the sealing edge, in particular, aligned therewith or with a sealing surface of the sealing edge. Manufacture of such a packaging container is particularly easy.

The at least one threaded or catch segment can be formed, at least in sections, parallel to the article base. Such a parallel section may form an area of abutment, where an article and its corresponding counterpart abut on each other in the closed state. Since the section is parallel to the article base, a relatively low resistance during twisting indicates to a user that the closed position has been achieved. Furthermore, accidental release or opening is largely avoided.

According to another embodiment of the invention, the segments are configured such that, when packaging articles associated with each other are arranged as intended (lid on container), apart from a mutual interlocking, a mutual pressing together is achieved. For this purpose, the segments may be sloped, at least in sections, with respect to the article base in the circumferential direction of the packaging article. It is sufficient to configure a segment or the segments of one of two packaging articles intended for each other (container or lid) in such a manner. For closing, container and lid are positioned with respect to each other such that the segments of the container engage in the intermediate spaces between the segments of the container lid. By twisting relative to each other, the segments of the container lid come into overlap with the segments of the container, thereby achieving the mutual interlocking. Due to the configuration of the segments in a sloped manner, at least in sections, with respect to the article base in the circumferential direction, the additional effect is achieved by the relative twisting that container and container lid are pressed together, whereby an additional sealing effect can be achieved.

Particularly advantageously, at least one segment of the article—e.g. a container and/or a container lid—is provided with a stop on the end side in the circumferential direction. This stop defines an end position of the article, e.g. container lid, with respect to the counterpart, e.g. container, which is achieved by twisting the same relative to each other. In this way, it can be avoided that the packaging article is over-twisted by the user during closing and that, after a mutual overlapping has been accomplished, the segments of container and container lid again enter into adjacent intermediate spaces and safe closure is not ensured.

In addition and alternatively thereto, according to a particularly advantageous embodiment, at least one segment of the article—container and/or container lid—can be provided with a slope on the front side in the circumferential direction. This slope is an entry slope or may serve as such ensuring safe mutual engagement of container and container lid during mutual twisting and facilitating closure of the packaging article according to the invention. Finally, at least one segment of the article may include a latching structure suited or intended for cooperation with a counterpart and locking or at least fixing an article and its counterpart (for example container and container lid) in a closed position. In this way, a packaging article closed in the intended manner (container lid attached to a container) is effectively prevented from being inadvertently released.

According to a further embodiment, a circumferential thickening, which is, in particular, discontinuous, can be formed on the thermoformed article, which thickening, when arranged as intended on a thermoformed article as a counterpart, is arranged on a counterpart-side surface of the article. Such a circumferential thickening advantageously improves the sealing effect in a packaging article closed as intended due to the defined abutment of packaging article and counterpart on each other. For example, the circumferential thickening on a lid can be formed at or on its container-side surface so that, when the lid is arranged as intended, the thickening comes to rest against the container on its upper edge or sealing edge or on a sealing film attached thereto and assists tight closure thereof. Particularly advantageously, the circumferential thickening is manufactured by means of 2 k technology. Thus, the thickening can be made of a material, for example rubber, which is soft and/or elastic in relation to the material of the residual packaging article so that an additional improvement of the sealing effect is achieved.

In case container lid and container are thermoformed packaging articles, the container lid is advantageously radially oversized with respect to the container. Thus, the advantage is achieved that possible changes in dimension, for example changes in diameter, of the container, for example due to production variations in the manufacturing process and/or in a sterilizations process, during or after filling the container with foodstuffs, can be compensated by radial tolerances of the lid.

BRIEF DESCRIPTION OF THE DRAWINGS

Further features and advantages of the present invention are apparent from the following exemplary description of a particularly preferred embodiment of the invention with reference to the drawings, wherein:

FIG. 4 shows an enlarged cutout of a top view onto the container with lid of FIG. 2.

DETAILED DESCRIPTION OF THE INVENTION

Figure 1:
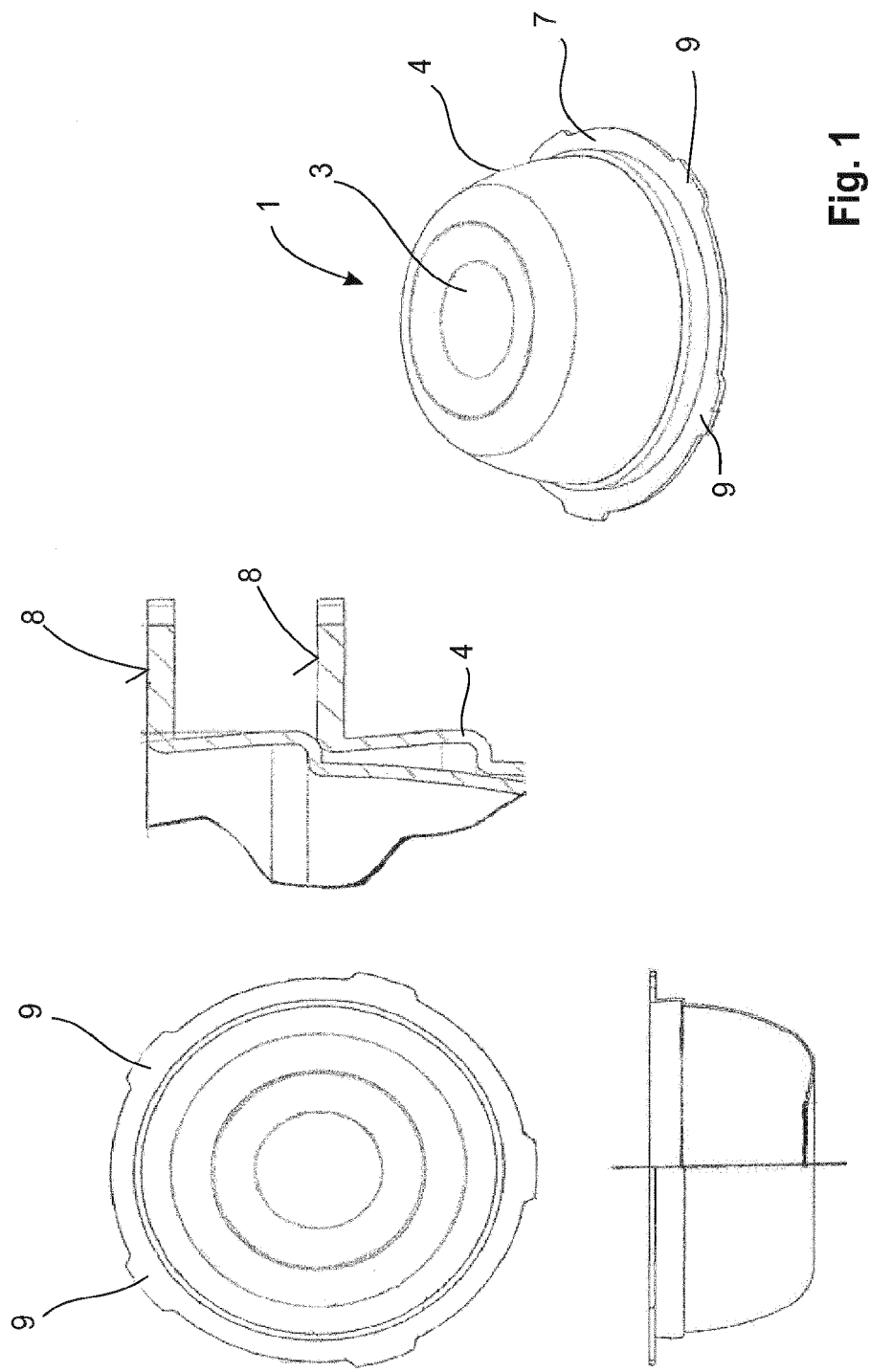
FIG. 1 shows a container for a thermoformed packaging article in various views.
Figure 2:
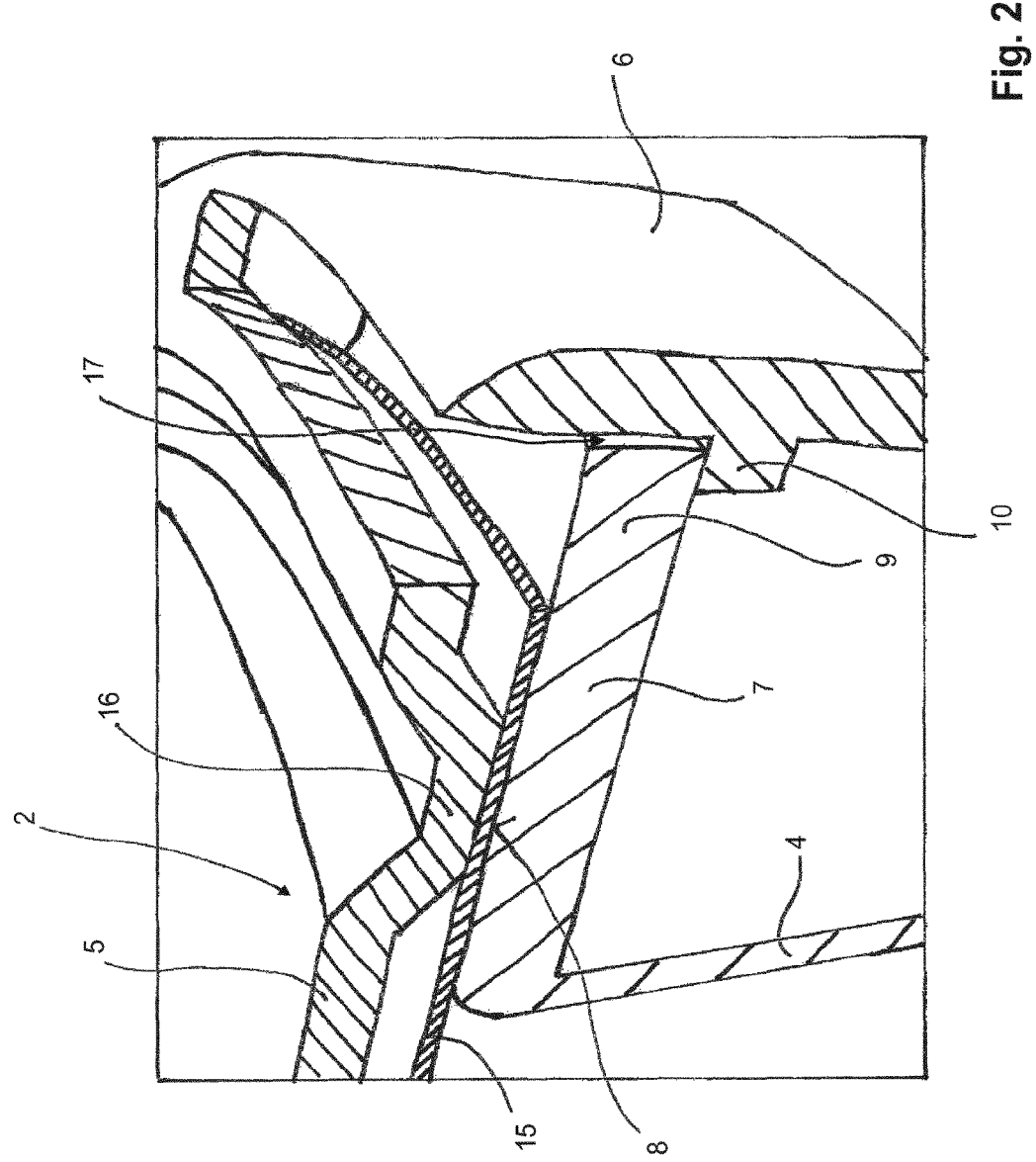
FIG. 2 shows an enlarged section of the container illustrated in FIG. 1 closed with a corresponding container lid.
Figure 3:
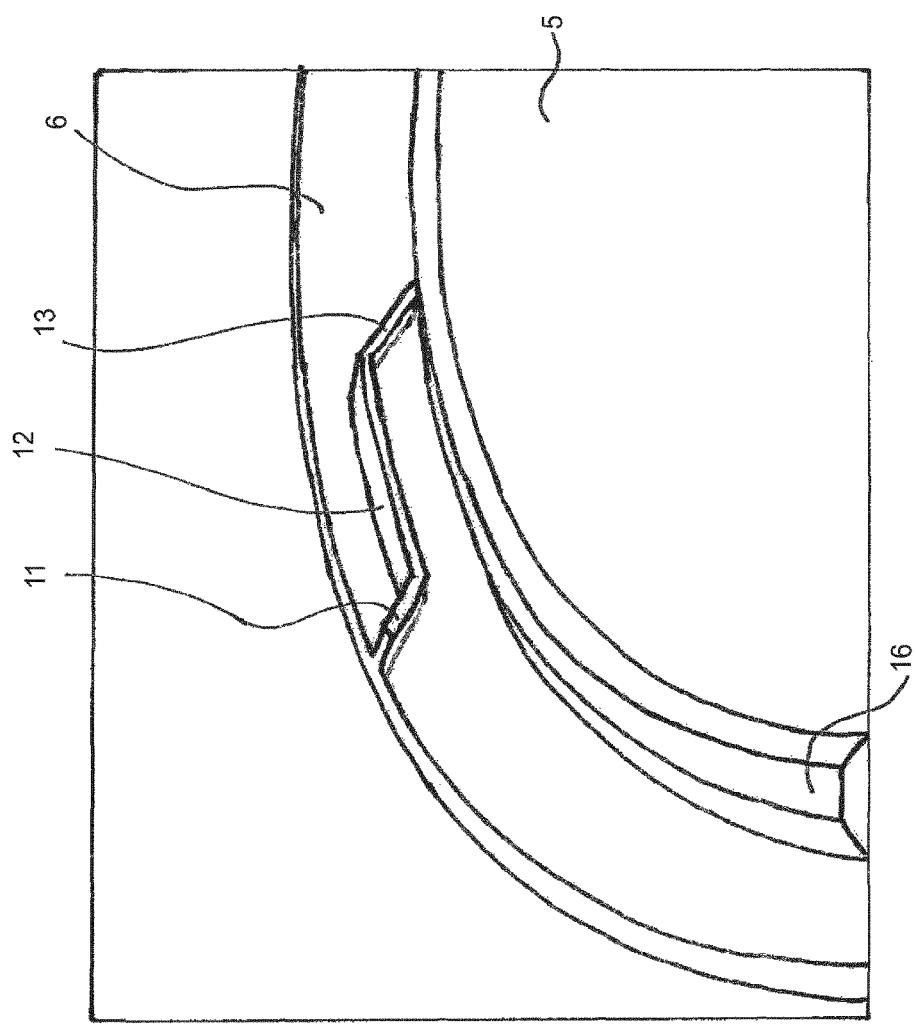
FIG. 3 shows a detailed view of the container lid illustrated in FIG. 2 in form of a cutout.

The container 1 illustrated in FIG. 1 in various views and the container lid 2 partially illustrated in FIG. 2 each define a thermoformed packaging article according to the invention. The container 1 comprises a container base 3 and a container wall 4, which correspond to article base and article wall. Accordingly, the container lid 2 comprises a lid base 5 and a lid wall 6.

The container 2 is provided with a circumferential sealing edge 7 on its side of the container wall 4 opposite to the container base 3. This sealing edge protrudes radially outwards from the container wall 4 and defines a sealing surface 8 on its upper surface. On the edge side, radially outwards projecting catch segments 9 are formed at the sealing edge 7. In the present example, the container 1 comprises a total of five catch segments 9. Said catch segments are aligned parallel to the container base 3 and, when the container lid 2 is arranged on the container 1 as intended, cooperate with threaded segments 10 formed on the container lid 2.

The threaded segments 10 of the container lid 2 project radially inwards from the inner surface thereof towards the container wall 4. Each threaded segment 10 comprises an entry region 11, which is sloped with respect to the lid base 5 (and with respect to the container base 3), a section 12, which is parallel to the lid base 5, and an end section 13, which is sloped with respect to the lid base 5.

The said entry region 11 defines an entry slope for one catch segment 9 of the container 1 each. For closing the container 1, the container lid 2 is arranged thereon such that its threaded segments 10 are each brought in between the catch segments 9 of the container 1. When the container lid 2 rests loosely on the container 1, container 1 and container lid 2 are twisted relative to each other, wherein the catch segments 9 are each engaged with a threaded segment 10. Entry of the catch segments 9 into the threaded segments 10 is facilitated by the sloped entry region 11 and the container lid 2 is pressed against the container 1 in the axial direction. When the relative rotational movement of container 1 and container lid 2 is continued, the catch segments 9 completely enter into the threaded segments 10 and come to rest in a manner overlapping the parallel section 12. The sloped end region 13 prevents over-twisting of the container lid 2 in relation to the container 1. A locking cam 14 is provided at the parallel section 12 of the threaded segment 10 for securing the position when the container lid 2 is completely closed, wherein the catch segment 9 runs over said locking cam and is retained in the completely closed position thereby.

FIG. 2 shows that the container 1 is tightly closed by means of a sealing film 15 in the manner of an originality seal. The sealing film 15 is arranged on the sealing edge 7 of the container 1 and is sealed on the sealing surface 8 and is located between lid and container when the container 1 is closed with the container lid 2. For improving the sealing effect, a circumferential annular bead 16 is formed on the container lid 2 on the inner side, i.e. on the side facing the container 1. Container 1 and container lid 2 are matched to each other in such a manner that, when the container lid 2 is closed, the annular bead 16 is pressed onto the sealing film 15 in a sealing manner while elastically deforming the container lid 2.

As illustrated especially in FIG. 2, when the container lid 2 is arranged on the container 1 as intended, a radial gap 17 is provided therebetween. By means of this gap, changes in diameter of the container 1, for example due to process variations in the manufacturing process and/or due to a sterilization process, can be compensated by radial tolerances of the lid.

The invention claimed is:

1. A method for manufacturing a thermoformed lid in a thermoforming tool including an upper die and a lower die, which are moveable against each other, wherein a plastic film is supplied between upper die and lower die of the thermoforming tool;

wherein the upper die and the lower die of the thermoforming tool are closed, and the plastic film is thermoformed, thereby forming the thermoformed lid having a lid wall, a lid base, and a plurality of thread segments, and the plurality of thread segments are spaced from each other in a circumferential direction of the thermoformed lid;

wherein each of the plurality of thread segments extends in a circumferential direction of the thermoformed lid and projects from the lid wall in a radial direction, and wherein each of the plurality of thread segments is at least in a section sloped with respect to the lid base in a circumferential direction of the thermoformed lid, and wherein each of the plurality of thread segments is formed, at least in part, parallel to a plane of the plastic film.

2. The method according to claim 1, wherein each of the plurality of thread segments is formed in its complete shape during thermoforming.

3. The method according to claim 1, wherein each of the plurality of thread segments is formed offset with respect to a plane of the plastic film in the direction of movement of the thermoforming tool.

4. The method according to claim 1, wherein a tool die is radially advanced during thermoforming, thus forming the plurality of thread segments.

5. The method according to claim 1, wherein a radial recess is formed in the upper and lower dies, the radial recess being vented during thermoforming so that the plastic film located in the thermoforming tool is moved into the recess forming the plurality of thread segments.

6. The method according to claim 1, wherein, after forming the plurality of thread segments, a region of at least one of the upper and lower dies is positioned radially enabling removal of the lid from the thermoforming tool.

7. A method for manufacturing a thermoformed lid in a thermoforming tool including an upper die and a lower die, which are moveable against each other, wherein a plastic film is supplied between upper die and lower die of the thermoforming tool;
  wherein the upper die and the lower die of the thermoforming tool are closed, and the plastic film is thermoformed, thereby forming the thermoformed lid having a lid wall, a lid base, and a plurality of thread segments, and the plurality of thread segments are spaced from each other in a circumferential direction of the thermoformed lid;
  wherein each of the plurality of thread segments extends in a circumferential direction of the thermoformed lid and projects from the lid wall in a radial direction,
  and wherein each of the plurality of thread segments is at least in a first section sloped with respect to the lid base in a circumferential direction of the thermoformed lid,
  and wherein each of the plurality of thread segments is formed, at least in part, parallel to a plane of the plastic film,
  and wherein each of the plurality of thread segments is at least in a second section sloped with respect to the lid base in a circumferential direction of the thermoformed lid.

* * * * *